US005420015A

United States Patent [19]

Wuerch

[11] Patent Number: 5,420,015
[45] Date of Patent: May 30, 1995

[54] COATABLE MASKING COMPOSITION AND METHOD

[75] Inventor: Daniel W. Wuerch, London, Canada

[73] Assignee: Minnesota Mining and Manufacturing Company, St. Paul, Minn.

[21] Appl. No.: 192,011

[22] Filed: Feb. 4, 1994

[30] Foreign Application Priority Data

Feb. 5, 1993 [CA] Canada ................... 2088866

[51] Int. Cl.$^6$ ............ C09D 5/00; C09D 105/00
[52] U.S. Cl. ........................... 106/162; 106/171; 106/186; 106/189; 106/197.1; 106/197.2; 106/190; 106/205; 106/208; 106/206; 106/215; 106/217; 106/2
[58] Field of Search ............... 106/2, 162, 171, 188, 106/189, 206, 208, 243, 287.26, 217, 176, 186, 190, 197.1, 197.2, 205, 215

[56] References Cited

U.S. PATENT DOCUMENTS

| 3,114,649 | 12/1963 | Oppenheim et al. | 117/6 |
|---|---|---|---|
| 4,122,217 | 10/1978 | Sturwold et al. | 427/156 |
| 4,347,266 | 8/1982 | Norman et al. | 427/154 |
| 4,428,984 | 1/1984 | Shimizu et al. | 427/220 |
| 4,525,501 | 6/1985 | Norman et al. | 524/28 |
| 4,548,967 | 10/1985 | Brown et al. | 524/56 |
| 4,654,086 | 3/1987 | Baird et al. | 106/206 |
| 4,911,218 | 3/1990 | Patitsas | 152/525 |
| 5,028,350 | 7/1991 | Marsek | 252/88 |
| 5,049,609 | 9/1991 | Patitsas | 524/386 |
| 5,058,648 | 10/1991 | Kansupada | 152/524 |
| 5,104,711 | 4/1992 | Marsek | 428/78 |
| 5,308,647 | 5/1994 | Lappi | 427/154 |

FOREIGN PATENT DOCUMENTS

| 750967 | 1/1967 | Canada | 400/48 |
|---|---|---|---|
| 1147613 | 6/1983 | Canada | C09K 3/22 |
| 2728464 | 6/1977 | France . | |
| 1604562 | 5/1978 | United Kingdom | B08B 3/08 |

Primary Examiner—David Brunsman
Attorney, Agent, or Firm—Gary L. Griswold; Walter N. Kirn; Ramon R. Hoch

[57] ABSTRACT

An improved liquid spray masking composition including an effective amount of a nonvolatile polyhydroxy component is provided. The preferred polyhydroxy components comprise polyglycerols, especially corn syrup. The presence of such materials in masking compositions improves performance of the compositions with respect to inhibition of high temperature swelling, blistering or spotting of the painted surface to which it is applied.

14 Claims, No Drawings

COATABLE MASKING COMPOSITION AND METHOD

BACKGROUND OF THE INVENTION

1. Field of the Invention

The present invention relates to a coatable composition for use in masking a surface. For example, the composition of the invention may be utilized to apply a mask to an undamaged painted surface of a vehicle (or to a glass, metal or other surface of a vehicle) to protect that portion of the vehicle from paint overspray during automobile repair shop painting of an adjacent (for example repaired) portion of the same vehicle.

2. Related Art

Portions of a vehicle adjacent to the area to be painted are generally "masked" to inhibit paint overspray from reaching and adhering to areas not intended to be painted. One typical masking or protective procedure involves applying a paper mask or plastic mask over the area not to be painted. Such masks can be applied and secured by tape or similar means. They are generally stripped from the vehicle and discarded after use. However, neither of these methods is fully acceptable at least because air currents can cause the paper or plastic to flutter and allow overspray to swirl behind the paper or plastic, or to tear and expose areas to the overspray.

Water-washable liquid masking compositions have been developed. Examples of such compositions are disclosed in U.S. Pat. Nos. 5,104,711; 5,028,350; 4,525,501; and 4,347,266. The system described in the '711 patent provides an example of such systems. According to the disclosure, the liquid masking composition comprises: solvent (typically water), a surfactant, a thickener or film former (typically xanthan gum), which provides desired rheological properties and which forms a film on the coated surface and surfactant, and a polyhydroxy liquid carrier (typically glycerol), which aids in dispersion of thickener and surfactant during formulation of the composition and which also operates as a plasticizer in the final coating. The composition is typically prepared by mixing together appropriate amounts of the various components. A portion of a vehicle to be masked is then spray-coated (typically and preferably with an atomizing spray gun) with the liquid masking composition. As the masking solution spreads, it will form a continuous "mask," i.e., a film or coating. A portion of the vehicle (not coated with film) to be finished is then coated with automotive primer, paint, or enamel, with any overspray that occurs typically landing on the masking film. After painting is complete and the paint film is dry, the masking film is readily removed with a washing solution, typically water or soapy water.

Previously used glycerol-based masking compositions have a tendency to mar, soften, and create hazing in the underlying paint film particularly after exposure to high temperature for prolonged periods of time.

While there have been some limited successes in providing effective protection with conventional masking compositions, some problems have been observed. In particular, in some applications when the masking film is washed off, a residue is observed to remain on the painted, previously masked, surface. While such residue can take a variety of forms, it is often observed to be a plurality of light-colored spots of residue. The presence of such residue on surfaces previously masked with liquid masking compositions is generally referred to as "spotting."

Problems with spotting are often associated with dissolved solids in the water used in the coating and counterions of anionic surfactants used to promote wetting and levelling of the coating. Spotting problems have been observed to be reduced through the use of deionized water and non-ionic surfactants in masking compositions.

Minimizing presence of the problem ionic components or reducing their ability to form precipitates has had some benefit. However, spotting has continued to be a problem, even when compositions involving improved surfactants, deionized water, and in some instances various sequestering agents are utilized.

It has been observed that problem spotting does not take place with equal frequency in all types of applications, to all types and colors of vehicles, in all environments. In particular, it is observed that problem spotting appears to be most persistent on dark-colored vehicles, although that observation may at least in part reflect the fact that spotting is much easier to detect when contrasted with a dark finish. Also, persistent spotting problems appear to be more likely to occur in warmer seasons or climates.

Upon close examination, it was observed that the persistent "spotting" problems were more than merely the generation of a surface deposit on the vehicle paint. It appeared that the spot causing residue had a component which reflected destruction of, or damage to, the paint on the vehicle.

In particular, vehicles, after having been coated with the masking solution, may be left out in the sun for a period of time to dry. Spotting appears to be most persistent on dark-colored cars treated in hotter environments. Darker-colored vehicles will tend to absorb a greater amount of energy and become hotter. The surface temperature of a dark-colored automobile can readily get to 80°-95° C., and some believe up to as high as 135° C., on especially hot, sunny days. Lighter-colored vehicles, of course, will not absorb as much thermal energy, and thus may not become as hot.

SUMMARY OF THE INVENTION

The compositions of the present invention address the problems of damage to the vehicle paint coatings and other surfaces from masking compositions, especially in high temperatures. The term "paint coating" or variants thereof as used herein in this context is meant to refer to coatings comprising any of a variety of materials including for example, acrylic enamels, acrylic lacquers, polyurethanes, metal flake paints and other typical vehicle finishes.

The present invention provides a masking composition for application to painted or unpainted surfaces (especially painted metal or painted plastic surfaces, or unpainted surfaces such as glass, i.e. windows) to protect same, for example, from paint overspray. The compositions are especially useful in automobile repair shop environments where damaged vehicle bodies are repaired, i.e. primed, painted, sanded, and polished under dusty conditions. The inventive compositions also find utility as paint spray booth coatings.

Coatable masking compositions according to the present invention comprise:

a) an effective amount of a surfactant;

b) from about 1 to about 10 weight percent based on weight of the composition of a plasticizer, the plasticizer having a volatility equal to or less than triethanolamine;

c) from about 1 to about 20 weight percent based on weight of the composition of a nonvolatile polyhydroxy organic component; and d) an effective amount of a thickener.

As used herein the term "coatable" denotes that the compositions of the invention have (or are capable of being rendered to have) viscosity which allow the compositions to be easily applied by rollers or spray guns to surfaces to be masked. Typically and preferably this entails the addition of solvent, such as water or a water-/alcohol mixture, to the composition, but mild heating alone might suffice. The term "plasticizer" as used herein has its generally accepted meaning in polymer chemistry as a nonvolatile compound which lowers the glass transition temperature of the coating. One preferred plasticizer for use in the invention is triethanolamine.

The coatable masking compositions of the invention afford improvements over previously used glycerol-based masking compositions by reducing or eliminating surface marring characteristics when tested under severe drying conditions (e.g. 4 hours at 105° C.). The compositions of the invention also may be formulated to provide a unique and variable dry-film tackiness which enables the film to "trap" any dust particles that contact it, while at the same time having sufficient film integrity to withstand marring or removal by moderate rubbing forces (such as someone accidentally brushing against the film formed from the inventive compositions). The inventive compositions may also be formulated to dry to a substantially transparent film so that transparency of underlying glass surfaces is preserved.

It has also been observed that in the absence of a nonvolatile polyhydroxy component, which serves as a high-temperature swelling, blistering or spotting inhibitor, a variety of surfactants appear to pose a problem with high-temperature spotting or paint destruction. The presence of a nonvolatile polyhydroxy component according to the present invention reduces or eliminates this problem.

The nonvolatile polyhydroxy component is preferably less volatile than glycerol, and may be selected from triethanolamine ("TEA"); polyglycerols; syrups derived from sugars such as fructose, glucose, sucrose, maltose, sorbitol, and the like; and mixtures thereof. Preferred compositions within the invention include as the nonvolatile polyhydroxy component ("NVPHC") high fructose corn syrup (CS) and TEA as the plasticizer component. High ratios of NVPHC to plasticizer (i.e., exceeding about 2.5:1), especially when the plasticizer is TEA, tend to produce compositions which are not tacky, while low ratios (i.e., less than about 0.5:1.0) tend to produce compositions which are too "tacky", making application to a surface difficult.

One class of preferred nonvolatile polyhydroxy components are those within the general formula:

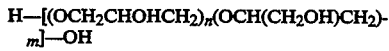

H—[(OCH$_2$CHOHCH$_2$)$_n$(OCH(CH$_2$OH)CH$_2$)$_m$]—OH wherein n and m are each integers ranging from 0 to about 30, inclusive, with the requirement that the quantity equal to (m+n) be at least 2. Preferably, the quantity equal to (m+n) is at least 3 and no more than 10.

Particularly preferred polyglycerols useful in the invention are triglycerols and tetraglycerols, or mixtures thereof with higher homologs.

Another embodiment of the invention is a method of inhibiting swelling, spot formation, and blistering by a masking composition applied to a painted surface, such as a surface of a vehicle. The method comprises the step of applying to the surface a masking composition within the invention. A preferred method is that wherein the masking composition-coated surface is heated to a temperature of 110° C. or higher, since the ingredients used in the composition will significantly reduce swelling and blistering of the masking composition under these adverse conditions.

The inventor herein has discovered that under exposure to substantial heat (about 80° C.), conventional masking compositions may generate actual and permanent damage to the enamel or paint of a vehicle. The damage appears as either blistering, swelling, spotting or some combination thereof. Such damage, which generally appears to concern relatively high-temperature conditions (surface temperature on the vehicle of at least 80° C.) and destruction of vehicle paint or enamel as opposed to mere deposition of ionic precipitate thereon, is referred to herein as "high-temperature damage," and when it concerns spotting, it is referred to herein as "high-temperature spotting."

While the precise causes of high-temperature swelling, blistering and spotting are not known, during the investigations which led to the development of the present invention it was theorized that the phenomenon may concern penetration of the vehicle paint or enamel by components (especially surfactant(s) and/or plasticizer(s)) in the masking composition or resulting film under high-temperature conditions. While investigations were being conducted, it was observed that when glycerol was applied to a painted surface simulating a vehicle paint coating, after exposure to a temperature of about 110° C., blistering of the paint coating resulted. In addition, it was observed that when surfactants of a type commonly used in masking solutions, for example, were applied to a painted surface simulating a vehicle paint coating, after exposure to a temperature of about 110° C., blistering of the paint coating resulted. Such an investigation does not eliminate the possibility that other components in the masking composition are also responsible for high-temperature spotting observed in the field; however, the observation provided a point for initial investigation into inhibition of high-temperature swelling, blistering, spotting, and, ultimately, prevention.

In general, a coatable masking composition for use in protecting surfaces (for example painted or enamel coated surfaces or unpainted glass surfaces) such as vehicle surfaces from paint overspray is considered within the scope of the present invention if its propensity to cause swelling, blistering or high-temperature spotting, i.e., damage at surface temperatures above about 80° C., is reduced. In general, improvement is observed by providing within the masking composition an effective amount of a nonvolatile polyhydroxy component which functions primarily as a swelling, blistering or high-temperature spotting inhibitor. By the term "effective amount" in this context it is meant that a sufficient amount of the nonvolatile polyhydroxy component is provided so that the composition exhibits a lower propensity for swelling, blistering or high-temperature spotting in the presence of the nonvolatile polyhydroxy component than in its absence. The nonvolatile polyhydroxy component may comprise a single material or a mixture of materials, as indicated herein.

A further problem is occasionally observed when triethanolamine is added to high temperature masking compositions. A water flushable "haze" gradually forms on surfaces to which the composition has been applied and subsequently flushed off. Without being bound by any specific theory, it is believed that triethanolamine swells and/or plasticizes painted surfaces at elevated temperatures. When the coating is flushed from the surface, the residual triethanolamine trapped in the paint exudes/"blooms" to the surface during air drying. This blooming tendency can be reduced to acceptable levels by controlling the concentration of thickener in the composition to an amount greater or equal to one percent by weight based on weight of triethanolamine.

It has been found that if a light-colored (e.g., white) painted surface is coated with a masking composition of the invention that contains triethanolamine and high fructose corn syrup and is then subjected to heat treatment, there may occur discoloration of the paint. The extent of discoloration depends upon both time and temperature (i.e., the discoloration after 30 minutes at 55° C. is less than that after 1 hour at 55° C., which is less than that after 1 hour at 105° C.). This discoloration appears to be caused by the combined effect of the corn syrup and the triethanolamine; no discoloration is seen when these materials are not present in combination. For this reason, compositions for use on light-colored paintwork should not contain both corn syrup and triethanolamine. If a composition is to contain corn syrup, it can contain glycerol or polyglycerol, or both, in place of triethanolamine. If a composition is to contain triethanolamine, then, in place of corn syrup, it can contain sorbitol or sucrose, of which sorbitol is preferred.

Coatable masking compositions according to the present invention include as critical components a thickener (film-former); a surfactant to wet the surface; a nonvolatile polyhydroxy component, which functions as a high-temperature swelling, blistering or spotting inhibitor; and a plasticizer, such as triethanolamine. As previously indicated, it may be necessary to add a solvent to the composition. In addition, the compositions may include optional adjuvants, such as anti-foaming agents, dyes, pigments, and the like.

Further aspects and advantages of the invention will be understood with reference to the following description.

DESCRIPTION OF PREFERRED EMBODIMENTS

Preferred compositions according to the present invention are masking compositions described in U.S. Pat. No. 5,104,711 improved by the presence therein of an effective amount of a nonvolatile polyhydroxy component as described herein. Preferred masking compositions of the present invention are generally not very expensive to prepare, since they comprise relatively inexpensive components. In addition, they may include industrial versions of food or cosmetic grade ingredients, and thus may be formulated to be relatively safe and nontoxic.

The nonvolatile polyhydroxy component is preferably an organic, hydrophilic, aliphatic compound or mixture of compounds. The nonvolatile polyhydroxy component is preferably less volatile than glycerol (glycerine), and preferably no more volatile than triethanolamine. The nonvolatile polyhydroxy component used in compositions according to the present invention preferably has a volatility of less than 0.30 weight percent/minute, more preferably less than 0.20 weight percent/minute, and most preferably less than 0.14 weight percent/minute as determined by thermogravimetric analysis (TGA) at 150° C. using the method described hereinbelow.

Beyond this requirement, in general a characteristic of the preferred nonvolatile polyhydroxy component is that it be water-soluble (or soluble or dispersible in the liquid carrier) and compatible with the remaining ingredients in the masking solution. It should, in operation, inhibit overspray from penetrating the masking film. Nontoxic and odorless materials are preferred. Also, tacky materials that will provide good dust retention and a substantially continuous masking film when the masking solution is sprayed on a vehicle are preferred. However, "non-tacky" embodiments of the invention are envisioned wherein the nonvolatile polyhydroxy compounds comprises mostly corn syrup. Preferably, nonvolatile polyhydroxy components are utilized that are not likely to stain, streak, diffuse into, or penetrate the paint, are relatively easily removed with post-treatment water washes, and will operate as plasticizers in the film formed.

Nonvolatile polyhydroxy compounds useful in practicing the invention include triethanolamine; polyglycerols; syrups derived from sugars such as fructose, glucose, sucrose, maltose, sorbitol, and the like; and mixtures thereof. Preferred nonvolatile polyhydroxy components are mixtures of triethanolamine (TEA) and high fructose corn syrup (CS). Other nonvolatile polyhydroxy compounds that can be used in the nonvolatile polyhydroxy component are polyglycerols within the general formula:

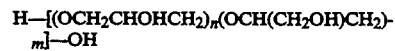

wherein m and n are each independently integers between 0 and 30, inclusive, with the requirement that the quantity equal to (m+n) be greater than or equal to 2. By "inclusive" in this context it is meant that either m or n may be zero or 30. Preferably, the quantity (m+n) is at least 3 and no greater than about 10.

Compositions according to one preferred embodiment of the present invention (as they are applied to form a mask) include at least 1 weight percent, preferably from about 1 to about 20 weight percent, of the nonvolatile polyhydroxy component. More preferably, the compositions contain from about 3 to about 20 weight percent of the nonvolatile polyhydroxy component by weight of inventive composition. The most preferred compositions include from about 10 to about 20 weight percent of the component, even more preferably 15 to 20 weight percent. It should be understood that both "tacky" and "non-tacky" embodiments of the invention are contemplated.

A preferred source of the plasticizer triethanolamine is Union Carbide Corp., South Charleston W. Va., while high fructose corn syrup is available from Casco Inc., Cardinal, Ontario, Canada. Sorbitol is available from Pfizer Inc., New York, N.Y.

Preferred polyglycerols include, but are not limited to those known under the trade designations "HEXAPOL", available from Hexagon Enterprises, Inc., Mountain Lakes, N.J.; "LONZA", available from Lonza, Inc., Fairlawn, N.J.; "KARLSHAMNS", available from Karlshamns Lipid Specialties USA, Columbus, Ohio; "DAVOS", available from Dayos Chemical Corporation, Englewood Cliffs, N.J.; "MAZOL PG-3", available from PPG/Mazer Industries, Inc., Gurnee, Ill.; and diglycerol, triglycerol, polyglycerol, and "High Purity DIGLYCERINE", available from Solvay Performance Chemicals, Inc., Greenwich, Conn. Analysis of selected samples of these polyglycerols using supercritical fluid chromatography show these materials to be mixtures of oligomers containing, in some cases, appreciable amounts of unreacted glycerol monomer and diglycerol dimer. Some samples also included water. Residual water was determined by potentiometric titration using Karl Fischer reagent. The results of these analyses are shown in Table 6 of the Test Methods Section hereinbelow.

Coatable masking compositions within the present invention may contain therein relatively low molecular weight (i.e., volatile) polyhydroxy compounds, which have the ability to also function as water-soluble liquid dispersants for the remaining ingredients. Mixtures of materials may be utilized as the volatile polyhydroxy component. Preferably nontoxic and odorless materials are utilized. Also, preferably tacky materials are used that will provide good dust retention and a substantially continuous masking film when applied.

Glycerol is a preferred material for use as the volatile polyhydroxy compound. Glycerol does not stain or streak the paint under normal, low temperature conditions, it is easily removed in the post-water wash, and it does inhibit paint overspray from penetrating the masking film. Glycerol is a material already known to be of appropriate physical and chemical characteristics for inclusion within such masking compounds, at least for low temperature applications, where paint swelling or spotting is not a problem, as indicated by the patents incorporated by reference hereinabove.

As indicated above, glycerol has been observed to generate high-temperature swelling, blistering or spotting when applied by itself or with a water carrier to a painted surface which is then exposed to high temperatures (110° C.). However, when it has been used in the presence of an effective amount of a nonvolatile polyhydroxy component as defined hereinabove, the presence of glycerol in the masking compositions does not generally present as much of a problem.

One preferred low cost coatable masking composition according to the present invention (in a form that may be applied to a surface to create a film) includes therein from about 10 to 20 weight percent, more preferably from about 15 to 20 weight percent, corn syrup. The present invention may be construed, especially in low tack applications, as being a substitution of a portion of the more expensive triethanolamine and attendant thickener with inexpensive corn syrup.

In some instances when the nonvolatile polyhydroxy component comprises a polyglycerol derived from glycerol, it may include unreacted glycerol therein (see Table 6 hereinbelow). In extreme cases, the commercial polyglycerol component may include up to about 30 percent by weight unreacted glycerol therein. Herein, when it is said that an amount of glycerol is within some stated weight percent range, reference is meant to the total amount of glycerol, whether present as a separately added ingredient or as a contaminant in a polyglycerol (or both). The presence of the glycerol contaminant in the commercial polyglycerol does not pose a problem, since inhibition to spotting, swelling or blistering is nevertheless provided.

One or more surfactants are added to the coatable masking composition to promote wetting and detergency (cleaning) of the target surface and leveling of the composition to form a film. The surfactants should be selected to minimize foam formation and sagging or slumping of the film. Foam formation during application of the inventive masking compositions may lead to non-uniform film thickness and insufficient coverage of the surface to be protected.

Any of a variety of surfactants may be used in the practice of the present invention as long as the surfactant does not lead to staining or spotting. The use of anionic surfactants, while acceptable with monovalent ionic species, should be minimized or judiciously selected to avoid the salt deposition associated with low-temperature spotting problems. In general, non-ionic surfactants containing appreciable quantities of ethylene oxide and/or propylene oxide should also be minimized since surfactants derived from these monomers have been associated with high-temperature spotting phenomena. The decreasing solubility of polyethylene oxide in water with increasing temperature may cause undesirable phase-separation or precipitation and nucleation of this class of surfactant at the masking film-paint interface at high-temperatures, thus causing the spotting problems.

Preferred non-ionic surfactants useful in preparing the coatable masking compositions of the present invention are the fatty acid alkanolamides which are known to stabilize the foaming action of other surfactants and to enhance detergency. The preferred non-ionic surfactants are the alkyloxylated alkylamides, especially that available under the trade designation "Makon NF-5" from Stepan Co., Northfield, Ill.; octyl phenol base surfactants such as "Triton X-102" from Union Carbide; the alkylamides of fatty acids; fatty acid esters of glycerol and polyglycerol; and non-ionic fluorocarbon surfactants of the types described in U.S. Pat. No. 4,347,266 (incorporated by reference herein), which impart excellent leveling properties to the applied coating. A particularly preferred flourochemical compound useful as a non-ionic surfactant is that known under the trade designation "FC-171" from Minnesota Mining and Manufacturing Company (3M), Saint Paul, Minn., having the general formula:

wherein $R_f = C_nF_{(2n+1)}$, n is an integer of about 8, and x is an integer ranging from 1 to about 10. When fluorocarbon surfactants are used in the composition, it is especially preferred to include alcohol in the solvent in order to prevent phase separation, as described hereinabove.

The amount of surfactant preferably is an amount effective for providing desirable wetting. For typical applications, the amount preferably ranges from about 0.01 to about 5 weight percent, more preferably ranging from about 0.05 to about 1.5 weight percent, most preferably ranging from about 0.1 to about 1.2 weight percent, based on the weight of composition of the invention as it is applied to the surface.

The thickener facilitates formation and leveling of all films formed from the compositions of the invention, and retention of the film on a nonhorizontal surface.

Preferably the thickener is a water-soluble film-forming material that imparts a nonbleeding character and sag resistance to the film.

In some instances, the thickener is preferably such that it also permits the film to remain in a tacky state after application (and solvent drying) in order to trap dust. Such instances are referred to herein as "wet" or "tacky" masks. In some applications dry masks will also be acceptable.

Thickeners useful in practicing the invention include: polysaccharides, such as hydroxyethyl cellulose (for example, that available under the trade names "NATROSOL" from Aqualon Co., and "CELLOSIZE", available from Union Carbide Corp.), hydroxypropyl cellulose (for example, that available under the trade name "KLUCEL," from Aqualon Co.), hydroxypropyl methyl cellulose (for example, that available under the trade name "METHOCEL", available from Dow Chemical Co.), sodium carboxymethyl cellulose (for example, that available under the trade names "NATROSOL" and "KLUCEL" from Aqualon Co.), galactomannan (for example, that available under the trade names "PROGACYL" and "AVG" available from Lyndal Division of Colloids, Inc.), guar gums (for example, those supplied by Meer Corp.), agar, algin, carrageenan, plant gum exudates (for example, gum arabic, gum tragacanth, and karaya gum), locust bean gum, pectin, and microbial polysaccharides (for example, dextran, xanthan gum, and welan gum). Other useful thickeners include polyvinyl alcohols. Mixtures of thickeners can be utilized as the thickener component.

The sodium salt of carboxymethyl cellulose (NaCMC) is a preferred thickener, and is available from Aqualon Company Inc., Hopewell, Va. NaCMC imparts to the masking solution particularly good shear-thinning, pseudoplastic properties, superior sag resistance, and enhanced resistance to paint bleed-through.

In general, an "effective amount" of thickener or film former should be used. By this it is meant that the amount of thickener should be sufficient to enable the masking solution to maintain a sag-resistant, overspray-resistant, continuous film when applied to a clean, painted, vertical panel when the panel is heated to ordinary spray booth temperatures (for example, at temperatures up to about 80° C.). As a general guide, the amount of thickener (especially when the thickener is NaCMC, known under one trade designation "Aqualon 7M2") preferably ranges from about 0.03 to about 3 weight percent, more preferably from about 0.5 to about 2.5 weight percent, and most preferably from about 1.2 to about 1.8 weight percent, of total masking composition weight as the composition is applied to form the coating.

These ranges are for NaCMC thickeners having a weight average molecular weight of about 250,000, such as that thickener known under the trade designation "Aqualon 7M2". The amount of thickener required depends on the molecular weight of the thickener. High molecular weight NaCMC (weight average molecular weight of about 700,000) such as that thickener known under the trade designation "Aqualon 7H" can be used at lower concentrations, i.e. about 1 percent by weight of triethanolamine. However, in all cases, the thickener concentration must exceed 1 percent by weight based on triethanolamine in order to avoid the "haze"/exudation problems described hereinabove.

The preferred solvent (or carrier) for compositions according to the present invention is a solution of water and $C_1$ to $C_4$ alcohols. However, in general any solvent or carrier may be utilized in which the remaining components of the composition are readily soluble or dispersible/emulsifiable and which possesses a sufficient volatility and coatability for the purposes intended.

Preferably, distilled or deionized water is used as a solvent, although tap water can be used in some instances. If water with significant ionic content is employed, it may be desirable to include in the composition a sequestering agent such as a tetrasodium salt of ethylenediaminetetraacetic acid (EDTA), sodium metaphosphate, aminopolycarboxylic acids, inorganic polyphosphates, polyacrylates, and organophosphorus compounds or mixtures thereof. Such sequestering agents serve as water softeners, chelating agents, or metal ion deactivators, thus inhibiting the formation of insoluble soap or scale.

The inventive composition has enhanced stability when alcohols having from 1 to 4 carbon atoms are included in the solvent (carrier). The composition preferably comprises from 0 to about 25 percent, more preferably from about 2 to about 20 percent, more preferably from about 5 to about 15 percent, and most preferably from about 7 to about 12 percent by weight alcohol. For purposes of the present invention "enhanced stability" means the composition will not exhibit visible phase separation when stored for extended periods (in excess of one year) at slightly elevated (50° to 60° C.) or lowered ($-10°$ to $+10°$ C.) warehouse temperatures. Finally, the inclusion of alcohol in the composition may in some cases produce improved wetting, leveling, and drying of coatings of the composition when applied to surfaces that are to be protected. Inclusion of more than 25 weight percent alcohol serves no apparent beneficial purpose and is therefore not desired for obvious economic and environmental reasons.

The amount of solvent carrier should be sufficient to dissolve (or disperse) the remaining components and impart to the compositions of the invention the desired spraying and spreading properties. The amount can vary depending on the types and amounts of the other ingredients in the composition, the type of application equipment, and the thickness of coating desired.

As a general guide the amount of solvent, especially if water, is preferably at least about 70 weight percent, more preferably about 75–95 weight percent, based on the masking composition weight. Lower amounts can be used if desired, particularly in concentrates intended to be diluted before use or if the composition is to be applied with equipment other than the preferred equipment identified herein. The percentages of components by weight in a masking composition are meant to refer to the composition as it is applied to the vehicle or other surface to be coated. Modifications, especially with respect to water (solvent) content, will be appropriate for a commercial product if it is to be diluted before application or if it is to be applied with equipment other than the preferred equipment identified herein.

Coatable masking compositions according to the present invention may include any of a variety of adjuvants therein or a combination of such adjuvants. In general, adjuvants usable in compositions according to the present invention may be the same as those known in the art in similar masking compositions. Thus, the adjuvants may include pigments, dyes, indicators, pH buffers, extending fillers, monovalent cation electrolytes ($Na^+$ and $K^+$ ions for example), water softening agents, defoamers, corrosion inhibitors, biocides and mixtures of these.

Preferred compositions will include at least an effective amount of water-soluble antimicrobial therein to inhibit microbial-induced degradation of the solution during storage. Generally, antimicrobials useful in compositions according to the present invention include chlorinated hydrocarbons, phenolics, quaternary ammonium compounds, organic sulphur compounds, metallic salts, organometallic compounds, and halogen-releasing compounds. The amount of biocide should preferably be sufficient to discourage degradation during a storage period of more than a year at temperatures up to about 38° C. A preferred amount of antimicrobial ranges from about 0.01 to about 0.5 weight percent, and more preferably ranging from about 0.02 to 0.10 weight percent, based on total weight of masking solution as it is applied to the surface to be masked.

The following is a list of some antimicrobials suitable for inclusion in compositions according to the present invention by trade designation and their associated chemical composition. The list is not intended to be exclusive.

1. "COSAN TM 91" Of Cosan Chemical Corporation which is 2-[(hydroxymethyl) amino]ethanol;
2. "DOWICIDE TM A" antimicrobial, which is sodium o-phenylphenate available from Dow Chemical Company;
3. "KATHON TM LX" and "KATHON TM LX 1.5%" supplied by Rohm & Haas Company which are mixtures of 5-chloro-2-methyl-4-isothiazolin-3-one and 2-methyl-4-isothiazolin-3-one;
4. The "TROYSAN TM"-brand biocides of Troy Chemical Company including:
    a. "142" which is 3,5-dimethyltetrahydro 1,3,5,2H-thiadiazine-2-thione;
    b. "174" which is 2[(hydroxymethyl)-amino]ethanol;
    c. "190" which is 2-[hydroxymethyl)amino]-2-methyl-1-propanol;
    d. "192" which is 2-[(hydroxymethyl)-amino]-2-methylpropanol;
    e. "PMA-100" which is phenyl mercury acetate;
    f. "PMA-30" which is solubilized phenyl mercury acetate;
    g. "PMDS-10" which is di (phenyl mercury) dodecenyl succinate;
    h. "POLYPHASE TM" which is 3-iodo-2-propynyl butyl carbamate;
    i. "CMP" acetate which is chloromethoxypropyl mercuric acetate;
    j. "Copper 8" which is copper naphthenate;
    k. "Anti-Mildew TM O" which is N-(trichloromethylthio) phthalimide; and
    l. "PMO-30" which is phenyl mercury oleate.

Organo-mercury compounds are generally to be avoided if there are environmental and toxicological concerns.

Corrosion inhibitors are sometimes added to the compositions of the invention if the masking composition-coated surface is left coated for an appreciable length of time. Corrosion inhibitors useful in the practice of the invention include, but are not limited to: anodic inhibitors, for example the nitrites, chromates, molybdates, tungstates, orthophosphates and silicate benzoates; cathodic inhibitors, for example, calcium bicarbonate, zinc sulfate, chromic sulfate, nickel sulfate, polyphosphate, and aminoethylene phosphonate; and, mixed inhibitors, for example, amines, triazoles, thiazols, and alkythioureas. Typically, about 0.03 to 0.2 percent by weight of corrosion inhibitor will be sufficient. Nitrites are preferred corrosion inhibitors because they tend to minimize waste water pollution. Also, corrosion inhibitors with monovalent cations are preferred because they minimize the viscosity problems which can occur with carboxymethyl cellulose and its salts in the presence of multivalent cations.

In some instances, for example with thickeners containing carboxylate groups, a small amount of a monovalent cation electrolyte (like sodium bicarbonate) may be used. These cations help stabilize the solution rheology by controlling the ratio of [acid form]:[salt form] carboxy groups attached to the thickener, thus controlling the electrostatic repulsion both between and within individual thickener polymer chains. The salts used preferably have monovalent cations, otherwise any suitable nontoxic or nonpolluting salt in the desired pH range may be used.

The water soluble ingredients of the inventive masking composition may be mixed into the water in any convenient order and by any convenient method. For solutions made from a solid thickener, a preferred mixing method generally involves pulverizing the thickener (or preferably employs a finely divided thickener that has been stirred to break up lumps) which is then added to the water. Because the thickener may tend to increase the viscosity of the mixture over time, the mixer speed is preferably periodically increased to counteract any viscosity increase. Any volatile $C_1$ to $C_4$ alcohol and fluorocarbon surfactant is preferably added last. The final solution is preferably mixed until well blended, or until the desired formulation viscosity is attained.

High shear mixing equipment is preferred; however, that mixing equipment known under the trade designation "LIGHTNIN", from Mixing Equipment Co., Chicago, Ill., has also been found to provide adequate mixing.

The masking composition of the invention preferably has a sufficiently low viscosity to enable it to be applied using atomizing spray nozzles of the types described below. Thus, the solution is preferably formulated to have a viscosity of less than about 4000 centipoise (4 pascal seconds) as measured at 21° C. on a Brookfield TM RVF viscometer fitted with a #3 spindle at 20 rpm.

Application of masking compositions according to the present invention to a surface may be applied using the method as described in U.S. Pat. No. 5,104,711. The masking solution may be applied using atomizing spray equipment, rollers, brushes, rags, or any other technique that will apply a sufficiently thick coating to the surface to be protected. In general, coatings on the order of about 100–600 micrometers thick are preferred. An atomizing spray head application is preferred, applying a quantity which produces a nonsagging film just prior to its starting to run. A Model 223-965 pneumatic high pressure airless sprayer from Graco, Inc., Minneapolis, Minn., fitted with a number 621 spray tip, has been found to provide good results. A DeVilbiss LMG 500 internal mix pressure pot system (air atomized) fitted with a 2.2 mm nozzle also provides good results. Other sprayers utilizing an atomizing spray head which can be used are "HVLP" (high volume, low pressure) sprayers.

The recommended application procedure for the Graco airless, mechanical atomization sprayers is: set the regulator at 550-620 KPa; hold the spray gun at a right angle to the surface to be coated; and, apply, in a single 50% overlapping application, to a thickness of 25-400 micrometers uniformly over the area to be protected preferably 100-400 micrometers, and most preferably 250-400 micrometers.

After application of the composition to a vehicle, the unmasked portion of the vehicle is painted. After the step of painting and drying the paint, the masking composition is removed, typically with a water wash from a hose or power washer.

Particularly preferred formulations for compositions according to the present invention are given in Table A. The percent figures are given as percent by weight, and the formulation represents the composition as it would be applied to a vehicle to form a mask, i.e, as dilute compositions.

TABLE A

| | General Formula[1] | Preferred Specific Formula | |
|---|---|---|---|
| Solvent (Water) | 40-98.9% | Water | 68.8% |
| Solvent (Alcohol) | 0-25% | Ethanol | 10.9% |
| NVPHC | 1-20% | Corn Syrup (Casco TM 2655)[2] | 13.6% |
| Plasticizer | 1-10% | Triethanolamine[3] | 4.1% |
| Thickener | 0.01-3% | Sodium Carboxymethylcellulose (NaCMC-7M2)[4] | 1.5% |
| Surfactant | 0.01-4% | Makon TM NF-5[5] | 0.95% |
| Fluorocarbon | 0-1% | 3M Company (FC TM -171)[6] | 0.07% |
| Antimicrobial | 0-0.5% | Dowicide TM A[7] | 0.05% |
| Adjuvants | 0-5% | None | None |

[1]Provided that selected percentages of all components sum to 100%.
[2]Casco 2655 is available from Casco Inc., Cardinal Ont. K0E 1E0
[3]Triethanolamine is available from Union Carbide Corp., South Charleston, WV
[4]CMC-7M2 is available from Aqualon Company, Hopewell, VA 23660
[5]Makon NF-5 is available from Stepan Company, Northfield, IL 60093
[6]FC-171 is available from 3M Company, St. Paul, MN 55144
[7]Dowicide A is available from Dow Chemical Company, Midland, MI 48640

Another preferred specific formula would include: 67.6% water, 14.8% of a 70% solution of Sorbitol, 4.45% sucrose, 1.2% sodium carboxymethylcellulose, 0.8% surfactant known as "Triton X-102", 0.07% surfactant known as "FC-171", 0.05% biocide known as "Dowicide A", and 10.9% denatured ethanol.

The coatable masking compositions of the invention also have utility as spray booth coatings. Unlike prior art spray booth coatings, tacky versions of the compositions of the present invention prevent premature dryout due to the presence of the nonvolatile polyhydroxy component, which allows the spray booth coating to continue trapping airborne dust and dirt for extended time periods. In addition, the coating is easy to remove because it remains water flushable after use.

TEST METHODS

It is unclear why the presence of nonvolatile polyhydroxy component in masking compositions according to the present invention generally inhibits high-temperature spotting, swelling, and blistering as defined herein. The experimental evidence that follows, however, permits some theoretical explanations. In particular, the protective film formed from conventional masking compositions generally includes only glycerol therein as the polyhydroxy component. It may be theorized that, under relatively high temperature conditions associated with dark vehicle surfaces exposed to the sun, the glycerol begins to evaporate from the composition. As the glycerol evaporates, it might be expected that the surfactant and other components may significantly partition into the phase represented by the paint/enamel, causing destruction of same. The presence of nonvolatile polyhydroxy components (for example, triethanolamine and/or corn syrup) may facilitate retention of a stable organic phase in the film with less of a likelihood of migration or diffusion of components into the paint/enamel.

In addition, as indicated above, it has been observed that glycerol itself is capable of penetration into the paint/enamel at temperatures of, for example, about 80° C. or higher, especially in the presence of surfactants. It may be that the presence of the higher nonvolatile polyhydroxy compounds (for example, triethanolamine and/or corn syrup) inhibits the likelihood of this partitioning or migration in a similar manner, i.e., by providing for a more stable organic phase in the protective coating, and thus a lower propensity (or concentration gradient in the case of diffusion) for migration of glycerol into the paint/enamel phase.

The volatility of the polyhydroxy components used in compositions according to the present invention was measured thermogravimetrically using a Dupont model 9900 Thermogravimetric Analyzer. The following instrumental parameters were selected: sample size-approximately 75 milligrams (the sample had an air interface surface area of approximately 56 square millimeters in the disposable aluminum sample pans used for the analysis), air flow rate—45 milliliters per minute. The following thermal profile was used, +20° C. per minute from room temperature to 110° C., isothermal at 110° C. for 3 minutes to remove traces of moisture and other low boiling volatile contaminants from the sample, 5° C. per minute from 110° C. to 150° C., and isothermal at 150° C. for an additional 70 minutes. The slope of the weight loss curve was determined from a 30 minute linear portion of the TGA plot from 20 minutes to 50 minutes (measured from t=0 at the time the sample temperature reached 150° C.). For the purpose of this invention, volatility is defined as minus one (−1) times the slope of the TGA weight loss curve. The volatility of glycerol (99% purity) as measured using this method was found to be 0.36 wt %/minute. The volatility of triethanolamine was found to be less than 0.36 wt %/minute.

The invention is further illustrated by the following nonlimiting examples, wherein all parts and percents are by weight, and all temperatures are in degrees Centigrade (°C.), unless otherwise stated.

EXAMPLES 1-32

These examples show what kinds of materials cause swelling, blistering and/or high temperature spotting and related damage to painted surfaces. Several drops of the materials shown in Table 1 were applied to steel test panels painted with DuPont black base coat/clear coat automotive paint and baked utilizing a bake cycle of 107°-110° C. for 30 minutes. The panels were obtained from Advanced Coatings Technologies Inc. of Hillsdale, Mich. 42942 under the designation #998-4065. These panels were coated by applying 2-3 drops of the material to be tested. The panels were then baked in an air circulating oven for three hours at 105° C. After cooling to room temperature, the panels were rinsed with water to remove the material(s). Upon drying, the panels were examined and rated using the following scale.

| RATING | PAINT DAMAGE |
|---|---|
| 0 | No visible paint damage |
| 1 | The paint is swollen, i.e., the line of demarcation between coated and uncoated[1] areas can be seen but the swell line cannot be felt with a thumbnail or fingernail. |
| 2 | The paint is swollen in the areas which were coated and the swelling can be felt by rubbing a thumbnail or fingernail over the edge of the swelled region. In some cases, a light spotting or haze is also visible. |
| 3 | The paint is swollen and softened so that it can be indented with a thumbnail. |
| 4 | The paint is swollen and spotting is evident. |
| 5 | The paint is badly blistered and can easily be scraped off with a thumbnail. |
| E | When an E follows a numerical rating, a material was observed exuding to the surface after a period of 24 hours, which could be removed by a water rinse. |
| H | When an H follows the numerical rating, a haze was observed which could not be removed by rinsing with water followed by wiping. |

[1]The uncoated areas are present either intentionally as a result of a small portion of the coating being removed after spray application of the masking solution, or unintentionally as a result of incomplete wetting of the painted surface, shrinkage of the liquid mask upon drying, or entrained air bubbles which were trapped in the coating.

Application of this rating scale is subjective, hence, repeat ratings do not necessarily fully agree among experiments. However, trends toward more or less severe high temperature spotting are clearly evident among different experiments.

Materials 2 through 15 are commercially available surfactants.

TABLE 1

| Component# | Material Tested | Rating/Comments | Supplier |
|---|---|---|---|
| 1 | Glycerine, 99% | 5 | a |
| 2 | Triton X-405 | 2-3 | b |
| 3 | Triton CF-76 | 3 | b |
| 4 | Triton N-57 | 4 | b |
| 5 | Biosoft EN-600 | 4 | c |
| 6 | Tween 80 | 2-3 | d |
| 7 | Interwet 33 | 4 | e |
| 8 | Makon NF-12 | 4 | f |
| 9 | Makon NF-5 | 2-3 | f |
| 10 | Tergitol D-683 | 2-3 | b |
| 11 | Tergitol TMN-6 | 4 | b |
| 12 | FC-129 | 4 | g |
| 13 | FC-171 | 2 | g |
| 14 | FC-170C | 4 | g |
| 15 | FC-120 | 4 | g |
| 16 | Casco 2655 High Fructose | 1-2 | h |
| 17 | Casco 1020 Glucose | 2-3 | h |
| 18 | Casco 1030 Glucose | 1-2 | h |
| 19 | Casco 1230 Glucose | 1-2 | h |
| 20 | Casco 1536 Enzose | 1-2 | h |
| 21 | 70% Sorbitol | 1 | i |
| 22 | Denatured Ethanol | 0 (evaporated) | j |
| 23 | 85% Triethanolamine (TEA) | 2E | k |
| 24 | 8% TEA, 1.5% NaCMC7M2 | 2 | 1 (NaCMC)[1] |
| 25 | 20% TEA, 1.5% NaCMC 7M2 | 2E | 1 |
| 26 | 8% TEA, 1.5% NaCMC7L | 2 | 1 (NaCMC)[1] |
| 27 | 8% TEA, 1.5% HEC | 2 | 1 (HEC)[2] |
| 28 | 8% TEA, 1.5% HPC | 2 | 1 (HPC)[3] |
| 29 | 8% TEA, 8% Casco 2655 | 2E | |

TABLE 1-continued

| Component# | Material Tested | Rating/Comments | Supplier |
|---|---|---|---|
| 30 | 8% TEA, 0.5% Starch* | 2EH | m (Starch-Hamaco 277) |
| 31 | 24 + 2% Makon NP-5 | 2 | |
| 32 | 24 + 4% Makon NP-5 | 4E (pinholing) | |

*Starch tends to cause hazing of the paint film when included as an adjuvant in the composition.
1) NaCMC = Sodium Carboxymethylcellulose
2) HEC = Hydroxyethyl Cellulose
3) HPC = Hydroxypropyl Cellulose Supplier Information:
a) Dow Chem. Co., Midland, MI 48640
b) Union Carbide Chemicals & Plastics Co. Inc., Danbury, Ct. 06817-0001
c) Stepan Canada Inc., Longford Mills, Ont. L0K 1L0
d) ICI Americas Inc., Wilmington, Delaware 19897
e) Interstab Chem. Inc., New Brunswick, NJ
f) Stepan Co., Northfield, IL 60093
g) 3M Company, St. Paul, MN 55144
h) Casco Inc., Cardinal, Ont. K0E 1 E0
i) Pfizer Inc., New York, NY 10017
j) Commercial Alcohols, Scarborough, Ont.
k) Union Carbide Corp., South Charleston, WV
l) Aqualon Company, Hopewell, Virginia 23860
m) A. E. Staley Mfg. Co., Decatur, IL 62525

EXAMPLES 33-36

These examples show the effect of using higher concentrations of triethanolamine (TEA) on the "haze" phenomenon.

The compositions shown in Table 2 were prepared by mixing the ingredients in the specified order:

1) The surfactant (Makon F-5), antimicrobial (Dowicide A), and corn syrup (Casco 2655) were added to the required amount of warm water (approximately 35°-40° C.). The resulting mixture was stirred for 5 minutes using an air mixer equipped with a 3-blade propeller to produce a uniform solution.

2) The appropriate amount of thickener (NaCMC) was then slowly added to stirred solution. Stirring was continued to produce a uniform solution (about 30 additional minutes of stirring).

3) The plasticizer (triethanolamine) was added and stirring continued for 5 more minutes.

4) The fluorocarbon surfactant (FC-171) and ethanol were mixed together in a beaker and slowly added to the stirred solution in order to prevent localized destabilization. The resultant masking composition was then stirred another 5 minutes to ensure proper product uniformity.

The resulting masking compositions were applied to the test panels used in the previous examples using an air atomized Optima gravity feed gun Model DSP (air pressure was adjusted to 275-345 Kpa) equipped with a 2.0 fluid tip, available from Autoshot Products Incorporated, Georgetown, Ontario L7G 4J7. The film thickness applied was measured using a wet film thickness gauge and found to average about 100 micrometers. The coated test panels were then baked for 4 hours at 105° C., removed from the oven, cooled to room temperature, and flushed with running tap water to remove the dried masking coating. The panels were rated for spotting and hazing at 24 hours and 72 hours. The results are included in Table 2.

TABLE 2

| | EXAMPLE | | | |
|---|---|---|---|---|
| | 33 | 34 | 35 | 36 |
| Raw Material | Wt. % | Wt. % | Wt. % | Wt. % |
| Water | 68.93 | 66.93 | 64.93 | 62.93 |
| Casco TM 2655 | 13.6 | 13.6 | 13.6 | 13.6 |
| Dowicide TM A | 0.05 | 0.05 | 0.05 | 0.05 |
| FC TM 171 | 0.07 | 0.07 | 0.07 | 0.07 |
| TEA | 5.0 | 7.0 | 9.0 | 11.0 |
| NaCMC (aqualon TM 7H) | 0.5 | 0.5 | 0.5 | 0.5 |
| Makon TM NF5 | 0.95 | 0.95 | 0.95 | 0.95 |
| Ethanol | 10.9 | 10.9 | 10.9 | 10.9 |
| TEST RESULTS | | | | |
| Visual rating | 2 | 2 | 2 | 2 |
| Haze-24 Hour | None | None | None | None |
| Haze-72 Hour | None | None | None | Yes |

EXAMPLES 37-40

These examples show that the preferred formulation may be altered to replace part (or all) of the triethanolamine plasticizer with either glycerol or polyglycerol.

The masking compositions shown in Table 3 were prepared, spray coated, and tested using the procedure of examples 33-36. The Hexapol G-3 and/or glycerol additions were made in place of, or contemporaneously with that of triethanolamine. Tests were carried out on the black base coat/clear coat panels obtained from Advanced Coatings Technologies Inc. Tests were also carried out on white panels that were obtained by painting cold rolled steel with white paint (Centari Acrylic Enamel) and air drying for 16 hours. Test results are also shown in Table 3. The visual and haze ratings are based on observation of the black panels. The product discoloration results are based on observation of the white panels. It will be seen that compositions that contained triethanolamine and corn syrup (Examples 38 and 40) caused discoloration after heat treatment, whereas compositions that did not (Examples 37 and 39) did not cause discoloration after heat treatment.

TABLE 3

| | EXAMPLE | | | |
|---|---|---|---|---|
| | 37 | 38 | 39 | 40 |
| Raw Material | Wt. % | Wt. % | Wt. % | Wt. % |
| Water | 68.8 | 68.8 | 68.8 | 68.8 |
| Casco TM 2655 | 13.6 | 13.6 | 13.6 | 13.6 |
| Dowicide TM A | 0.05 | 0.05 | 0.05 | 0.05 |
| FC 171 | 0.07 | 0.07 | 0.07 | 0.07 |
| Hexapol TM G-3[8] | 4.1 | 2.0 | — | — |
| Glycerol | — | — | 4.1 | 2.0 |
| Triethanolamine | — | 2.1 | — | 2.1 |
| NaCMC (aqualon TM 7M2) | 1.5 | 1.5 | 1.5 | 1.5 |
| Makon TM NF5 | 0.95 | 0.95 | 0.95 | 0.95 |
| Denatured EtOH | 10.9 | 10.9 | 10.9 | 10.9 |
| TEST RESULTS | | | | |
| Visual rating @ 24 hour | 2 | 2 | 2 | 2 |
| Haze 24 Hour | None | None | None | None |
| Haze 72 Hour | None | None | None | None |
| Product Discoloration: | | | | |
| (55° C. 3 days) | None | Yes | None | Yes |
| (105° C. 4 hours) | None | Yes | None | Yes |

[8]Hexapol TM G-3 is available from Hexagon Enterprises, Inc., Mountain Lakes, New Jersey 07046.

EXAMPLES 41-45

The masking compositions shown in Table 4 were prepared, spray coated and tested using the procedure of examples 33-36. These compositions contained no corn syrup but contained sorbitol and different concentrations of triethanolamine (examples 41-44) or sucrose and triethanolamine (example 45). Tests were carried out on black and on white panels, as described in examples 37-40. Test results are also given in Table 4.

TABLE 4

| | EXAMPLE | | | | |
|---|---|---|---|---|---|
| | 41 | 42 | 43 | 44 | 45 |
| Raw Material | Wt. % | Wt. % | Wt. % | Wt. % | Wt. % |
| Water | 66.53 | 64.53 | 62.53 | 60.53 | 71.93 |
| Sorbitol[1] | 15.0 | 15.0 | 15.0 | 15.0 | — |
| Sucrose[2] | — | — | — | — | 10.5 |
| Dowicide TM A | 0.05 | 0.05 | 0.05 | 0.05 | 0.05 |
| FC 171 | 0.07 | 0.07 | 0.07 | 0.07 | 0.07 |
| TEA | 5.0 | 7.0 | 9.0 | 11.0 | 4.1 |
| NaCMC (aqualon TM 7M2) | 1.5 | 1.5 | 1.5 | 1.5 | 1.5 |
| Makon TM NF5 | 0.95 | 0.95 | 0.95 | 0.95 | 0.95 |
| Denatured EtOH | 10.9 | 10.9 | 10.9 | 10.9 | 10.9 |
| TEST RESULTS | | | | | |
| Visual rating @ 24 hour | 2 | 2 | 2 | 2 | 2 |
| Haze 24 Hour | None | None | None | None | — |
| Haze 72 Hour | None | None | None | Yes | — |
| Product Discoloration: (105° C. 4 hours) | None | None | None | None | None |

[1]Sorbitol is a 70% solution available from ICI Specialty Chemicals, Wilmington, DE 19897 or a 70% solution available from Pfizer Chem. Division, New York, NY 10017.
[2]Sucrose was normal grocery store white sugar.

EXAMPLES 46-49

The masking compositions shown in Table 4 were prepared, spray coated and tested using the procedure of examples 33-36. The compositions contained sorbitol and, in partial or complete replacement of triethanolamine, Hexapol G-3 or glycerol. Tests were carried out on black and white panels, as described in examples 37-40. Results are also given in Table 5.

TABLE 5

| | EXAMPLE | | | |
|---|---|---|---|---|
| | 46 | 47 | 48 | 49 |
| Raw Material | Wt. % | Wt. % | Wt. | Wt. % |
| Water | 67.43 | 67.43 | 67.43 | 67.43 |
| Sorbitol[1] | 15.0 | 15.0 | 15.0 | 15.0 |
| Dowicide TM A | 0.05 | 0.05 | 0.05 | 0.05 |
| FC 171 | 0.07 | 0.07 | 0.07 | 0.07 |
| TEA | — | 2.1 | — | 2.1 |
| Hexapol TM G-3[8] | 4.1 | 2.0 | — | — |
| Glycerol | — | — | 4.1 | 2.0 |
| NaCMC (aqualon TM 7M2) | 1.5 | 1.5 | 1.5 | 1.5 |
| Makon TM NF5 | 0.95 | 0.95 | 0.95 | 0.95 |
| Denatured EtOH | 10.9 | 10.9 | 10.9 | 10.9 |
| TEST RESULTS | | | | |
| Visual rating @ 24 hour | 2 | 2 | 2 | 2 |
| Haze 24 Hour | None | None | None | None |
| Haze 72 Hour | None | None | None | None |
| Product Discoloration: (105° C. 4 hours) | None | None | None | None |

[1]Sorbitol is a 70% solution available from ICI Specialty Chemicals, Wilmington, DE 19897 or a 70% solution available from Pfizer Chem. Division, New York, NY 10017.

Table 6 tabulates useful polyglycerols for use in the compositions of the present invention and their compositional analysis by various methods indicated.

TABLE 6

| Polyglycerol | % H₂O[4] | Glycerol[2] (% by weight) | H₂O + Glycerol | Diglycerol[3] (area %) |
|---|---|---|---|---|
| Diglycerol (CLS) | — | — | — | 97.0 |
| Hexapol ™ G-3 | <2% | 26.0 | ≈27 | 44.3 |
| Hexapol ™ G-6 | <2% | 15.5 | ≈16.5 | 35.7 |
| Hexapol ™ G-10 | <2% | 3.5 | ≈4.5 | 26.0 |
| LONZA ™ Triglycerol | 22.1% | 16.0 | 38.1 | 37.6 |
| LONZA ™ HEXAGLYCEROL | ≈15% | 5.0 | ≈20 | 26.2 |
| LONZA ™ DECAGLYCEROL | 20.4% | 3.5 | 23.9 | 23.8 |
| Glycerol 96% | 4% | 96.0 | 100 | N.D.[1] |
| Glycerol 99.7% | 0.3% | 99.7 | 100 | N.D.[1] |
| Karlshamn Hexaglycerol | ≈4% | 8.0 | ≈12 | 27.9 |
| Karlshamn Decaglycerol | ≈1 | 4.0 | ≈5 | 24.8 |
| PPG-Mazer Triglycerol | 9–12% | 18.5 | 27.5–30.5 | 40.9 |
| DAVOS ™ Polyglycerine 04 | 0.26% | 5.0 | 5.3 | 17.3 |
| DAVOS ™ Polyglycerine 06 | 0.12% | 2.0 | 2.1 | 11.4 |

[1]N.D. = Not Determined
[2]The percentage of glycerol as a contaminant in the commercial source of the polyglycerol as determined by supercritical fluid chromatography.
[3]The percentage of diglycerol as a contaminant in the commercial source of the polyglycerol (area %) as determined by supercritical fluid chromatography.
[4]Determined by potentiometric titration using Karl Fischer reagent.

What is claimed is:

1. A coatable masking composition suitable for application to a surface to protect same from paint overspray, said masking composition comprising:
   a) a surfactant;
   b) from about 1 to about 10 weight percent based on weight of said masking composition of a plasticizer,
   c) from about 1 to about 20 weight percent based on weight of said masking composition of a nonvolatile polyhydroxy organic component selected from the group consisting of glucose, maltose, fructose, sucrose, sorbitol, and mixtures thereof; and
   d) a thickener.

2. The masking composition of claim 1 wherein said surfactant is selected from the group consisting of fatty acid alkylamides, fatty acid alkanolamides, fatty acid esters of glycerol, fatty acid esters of polyglycerol, non-ionic surfactants, fluorocarbon surfactants, and mixtures thereof.

3. The masking composition of claim 1 wherein said thickener is selected from the group consisting of hydroxyethyl cellulose, hydroxypropyl cellulose, hydroxypropylmethyl cellulose, carboxymethyl cellulose, sodium carboxymethyl cellulose, potassium carboxymethyl cellulose, galactomannan, guar gum, agar, algin, carrageenan, plant gum exudates, locust bean gum, pectin, microbial polysaccharides, polyvinyl alcohols, and mixtures thereof.

4. The masking composition of claim 1 wherein said thickener is carboxymethyl cellulose.

5. The masking composition of claim 1 further comprising from about 40.0 percent to about 98.9 percent by weight of a suitable liquid carrier, said carrier comprising water and $C_1$ to $C_4$ alcohols.

6. The masking composition of claim 5 wherein the weight percent surfactant is at least about 0.01 percent of said masking composition.

7. The masking composition of claim 1 further comprising an antimicrobial material.

8. The masking composition of claim 1 further comprising less than 5 percent by weight of an adjuvant selected from the group consisting of starch, pH control buffers, corrosion inhibitors, sequestering agents, defoaming agents, dyes, indicators, and pigments.

9. The masking composition of claim 1, wherein said plasticizer comprises triethanolamine.

10. A coatable masking composition suitable for application to a surface to protect same from paint overspray, said masking composition comprising:
    a) a surfactant;
    b) from about 1 to about 10 weight percent based on weight of said masking composition of a plasticizer,
    c) from about 1 to about 20 weight percent based on weight of said masking composition of corn syrup; and
    d) a thickener.

11. The masking composition of claim 10, wherein said plasticizer comprises triethanolamine.

12. A coatable masking composition suitable for application to a surface to protect same from paint overspray, said masking composition comprising a surfactant comprising a fluorochemical compound; from about 10 to about 20 weight percent based on weight of said masking composition of a nonvolatile polyhydroxy organic component selected from the group consisting of glucose, maltose, fructose, sucrose, sorbitol, and mixtures thereof; denatured ethanol; and a thickener.

13. The masking composition of claim 12, wherein said nonvolatile polyhydroxy organic component comprises a mixture of sorbitol and sucrose, and said thickener comprises sodium carboxymethylcellulose.

14. The masking composition of claim 12, further comprising water carrier; an octyl phenol surfactant; and an antimicrobial material.

* * * * *

UNITED STATES PATENT AND TRADEMARK OFFICE
CERTIFICATE OF CORRECTION

PATENT NO. : 5,420,015
DATED : May 30, 1995
INVENTOR(S) : Daniel W. Wuerch

It is certified that error appears in the above-indentified patent and that said Letters Patent is hereby corrected as shown below:

On line "[75]" of the title page, "London, Canada" should read --London, Ontario, Canada--.

Col. 7, line 4, "Dayos" should read --Davos--.

Col. 11, line 46, "di (phenyl" should read --di(phenyl--.

Col. 11, line 53, ""Anti-Mildew ™ O"" should read --"Anti-Mildew™ O"--.

Signed and Sealed this

Twenty-third Day of April, 1996

BRUCE LEHMAN

Attest:

Attesting Officer

Commissioner of Patents and Trademarks